United States Patent
Byun et al.

(10) Patent No.: US 12,437,512 B2
(45) Date of Patent: Oct. 7, 2025

(54) METHOD AND DEVICE FOR SEGMENTING OBJECTS IN IMAGES USING ARTIFICIAL INTELLIGENCE

(71) Applicant: University Industry Foundation, Yonsei University, Seoul (KR)

(72) Inventors: Hyeran Byun, Seoul (KR); Sanghuk Lee, Seoul (KR); Cheolhyun Mun, Seoul (KR); Jewook Lee, Seoul (KR); Pilhyeon Lee, Seoul (KR)

(73) Assignee: UNIVERSITY INDUSTRY FOUNDATION, YONSEI UNIVERSITY, Seoul (KR)

( * ) Notice: Subject to any disclaimer, the term of this patent is extended or adjusted under 35 U.S.C. 154(b) by 407 days.

(21) Appl. No.: 18/085,046

(22) Filed: Dec. 20, 2022

(65) Prior Publication Data
US 2023/0410477 A1    Dec. 21, 2023

(30) Foreign Application Priority Data
Jun. 15, 2022 (KR) .......... 10-2022-0072630

(51) Int. Cl.
*G06V 10/00* (2022.01)
*G06V 10/75* (2022.01)
*G06V 10/764* (2022.01)

(52) U.S. Cl.
CPC .......... *G06V 10/765* (2022.01); *G06V 10/751* (2022.01)

(58) Field of Classification Search
CPC ............ G06N 3/02; G06N 3/08; G06N 3/042; G06N 3/045; G06N 3/047; G06N 3/082; G06N 3/092; G06N 3/088; G06N 3/0475; G06N 3/0464; G06T 7/82; G06T 7/0454; G06T 7/10; G06T 7/765; G06T 7/255; G06T 7/11; G06T 7/751; G06T 7/60; G06T 2207/20081; G06T 2207/20084; G06F 17/10

See application file for complete search history.

(56) References Cited

U.S. PATENT DOCUMENTS

| | | | |
|---|---|---|---|
| 10,768,628 B2 * | 9/2020 | Martin | G05D 1/0231 |
| 10,970,871 B2 * | 4/2021 | Nezhadarya | G06T 15/20 |
| 11,948,677 B2 * | 4/2024 | Ghose | G06N 3/045 |
| 11,961,233 B2 * | 4/2024 | Liu | G06T 7/174 |
| 11,972,569 B2 * | 4/2024 | Price | G06T 7/11 |

(Continued)

FOREIGN PATENT DOCUMENTS

KR    10-2020-0074940 A    6/2020

*Primary Examiner* — Amir Alavi
(74) *Attorney, Agent, or Firm* — Paratus Law Group, PLLC

(57) ABSTRACT

A method of segmenting objects in an image using artificial intelligence includes obtaining, by an analysis device, an image containing at least one object; inputting the image acquired by the analysis device into a segmentation model; and segmenting, by the analysis device, objects in the acquired image based on values output by the segmentation model, wherein an image containing at least one object is used as learning data, the size of objects in the learning data is estimated as part of the learning process, different weightings are given to pixels of which the objects consist according to the estimated size of the objects, and the segmentation model is trained based on a loss function in which the given weightings are considered, a size-weighted loss function.

8 Claims, 8 Drawing Sheets

(56) References Cited

U.S. PATENT DOCUMENTS

| | | | |
|---|---|---|---|
| 11,972,593 B2* | 4/2024 | Ravishankar | A61B 5/7475 |
| 11,978,548 B2* | 5/2024 | Park | G16H 30/00 |
| 12,033,365 B2* | 7/2024 | Huang | G06T 7/11 |
| 12,056,878 B2* | 8/2024 | Fuchs | G06F 18/24 |
| 2003/0176931 A1* | 9/2003 | Pednault | G06N 7/01 |
| | | | 700/44 |
| 2020/0082560 A1* | 3/2020 | Nezhadarya | G06T 7/70 |
| 2023/0410477 A1* | 12/2023 | Byun | G06V 10/82 |

* cited by examiner

FIG. 4
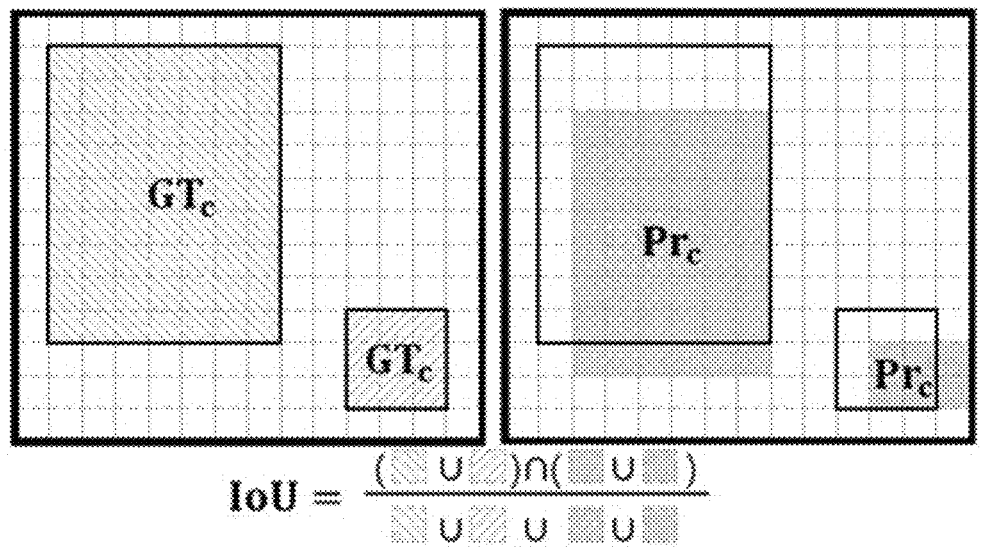
(A)
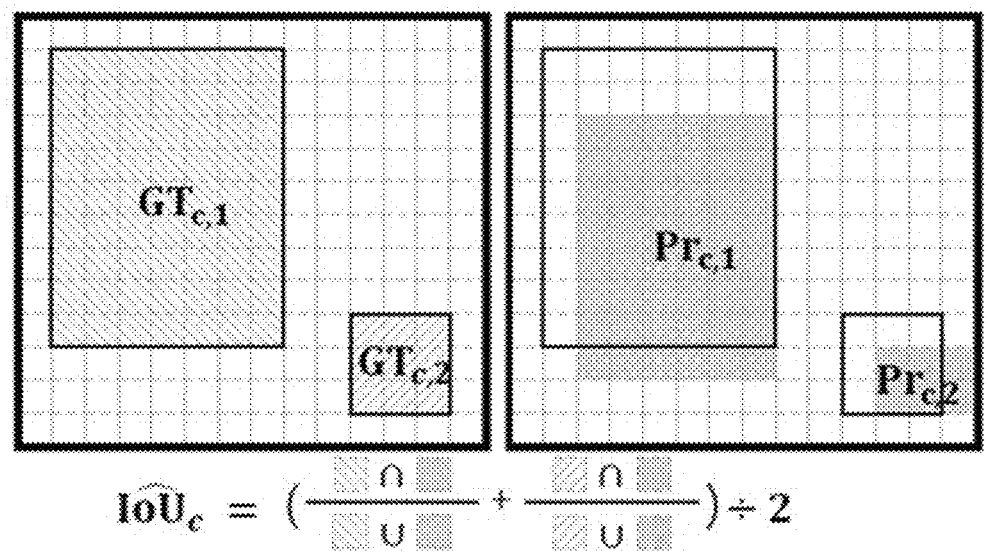
(B)

FIG. 5
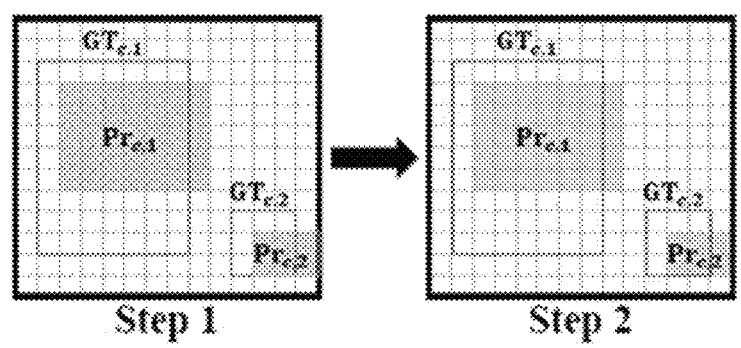
(a) Case 1
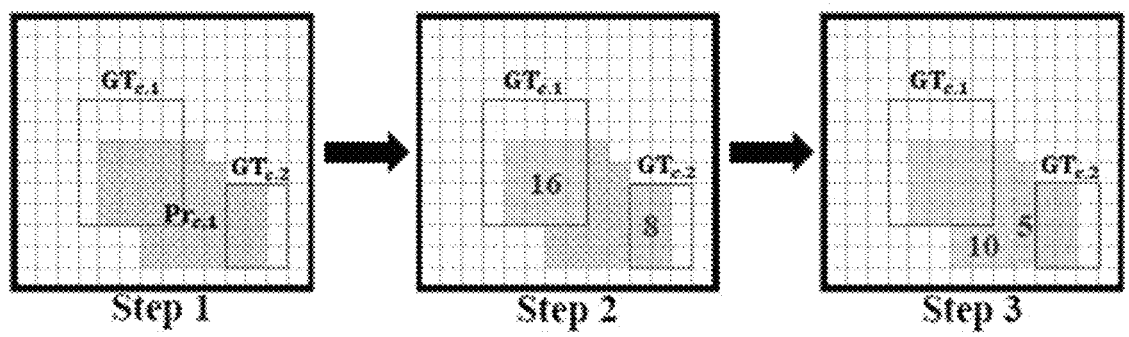
(b) Case 2

FIG. 7

Table 1: Experimental results for PASCAL VOC.

| Supervision | Method | mIoU | IA-mIoU | $IA_L$ | $IA_M$ | $IA_S$ |
|---|---|---|---|---|---|---|
| $\mathcal{F}$ | DeepLabV2 [4] | 77.8 | 65.8 | 80.2 | 57.2 | 18.8 |
|  | +Ours | +0.6 | +3.7 | +1.0 | +5.8 | +5.6 |
| $\mathcal{I}$ | IRN [1] | 64.8 | 56.0 | 66.2 | 49.6 | 17.5 |
|  | +Ours | +0.9 | +3.5 | +1.4 | +5.3 | +7.7 |
|  | CDA [39] | 66.6 | 57.2 | 68.3 | 51.7 | 15.8 |
|  | +Ours | +1.2 | +4.6 | +2.1 | +5.8 | +8.9 |
| $\mathcal{I},\mathcal{S}$ | EDAM [43] | 70.7 | 60.7 | 72.5 | 52.3 | 21.3 |
|  | +Ours | +0.3 | +1.9 | +1.1 | +2.2 | +2.2 |
|  | NS-ROM [45] | 70.4 | 60.2 | 72.7 | 51.3 | 19.3 |
|  | +Ours | +0.1 | +1.9 | +1.0 | +2.7 | +2.6 |
| $\mathcal{B}$ | BANA [35] | 72.6 | 59.6 | 73.7 | 49.3 | 14.7 |
|  | +Ours | +0.0 | +2.8 | +0.9 | +4.5 | +3.7 |
|  | BBAM [29] | 72.7 | 60.5 | 74.1 | 50.2 | 14.7 |
|  | +Ours | +0.2 | +1.0 | +0.2 | +1.3 | +1.7 |

FIG. 8

Table 4: Ablation study on each component of our loss function.

| Method | mIoU | IA-mIoU | $IA_L$ | $IA_M$ | $IA_S$ | $IA_I^{70\sim100}$ |
|---|---|---|---|---|---|---|
| DeepLabV2 | 77.8 | 65.8 | 80.2 | 57.2 | 18.8 | 81.7 |
| with $L_{sw}$ | 77.5 | 68.7 | 80.6 | 62.0 | 23.0 | 81.5 |
| with $L_{sb}$ | 78.4 | 69.5 | 81.2 | 63.0 | 24.4 | 82.1 |

METHOD AND DEVICE FOR SEGMENTING OBJECTS IN IMAGES USING ARTIFICIAL INTELLIGENCE

ACKOWLEDGEMENTS

The present patent application has been filed as a research project as described below.
[National Research Development Project supporting the Present Invention]
[Project Serial No.] 1711152718
[Project No.] 2020-0-01361-003
[Department] Ministry of Science and ICT
[Project management (Professional) Institute] Institute of Information & Communication Technology Planning & Evaluation
[Research Project Name] Information & Communication Broadcasting Research Development Project
[Research Task Name] Artificial Intelligence Graduate School Support Project (3/5)
[Contribution Ratio] 1/2
[Project Performing Institute] University Industry Foundation, Yonsei University
[Research Period] 2022.01.01~ 2022.12.31
[National Research Development Project supporting the Present Invention]
[Project Serial No.] 1711156559
[Project No.] 2022R1 A2B5B02001467
[Department] Ministry of Science and ICT
[Project management (Professional) Institute] National Research Foundation of Korea (NRF)
[Research Project Name] Mid-career Follow-up Study Project
[Research Task Name] Domain Generalization for Image and Video Understanding Robust to Unseen Domain
[Contribution Ratio] 1/2
[Project Performing Institute] University Industry Foundation, Yonsei University
[Research Period] 2022.03.01~ 2025.02.28

CROSS-REFERENCE TO PRIOR APPLICATION

This application claims priority to Korean Patent Application No. 10-2022-0072630 (filed on Jun. 15, 2022), which is hereby incorporated by reference in its entirety.

BACKGROUND

The present disclosure relates to a segmentation model that is trained to detect and segment even relatively small objects in an image and a method of evaluating the segmentation model in which it is also taken into account how well the segmentation model can detect small objects.

The technology by which a computer detects objects in an image is called segmentation. Through the segmentation, it is possible to know which object or class a pixel belongs to in an image.

The segmentation is one of the important technologies in the fields of aviation, medical diagnosis, unmanned vehicles, technology for sensing humans, etc., and research on the technology is actively being conducted. Recently, artificial intelligence models have been widely used for the operation of detecting objects in images.

RELATED ART DOCUMENT

Patent Document (Patent Document 1) Korean Patent Application Publication No. 10-2020-0074940

SUMMARY

A segmentation model for segmenting objects in images is trained by the learning method where the segmentation model speculates which object a pixel belongs to in an image and then the result is compared with the correct answer. In the conventional learning method, all pixels in an image are treated equally. Thus, segmentation models can segment objects that occupy many pixels in an image but cannot segment objects that occupy few pixels well. This is because the segmentation models have to detect large objects to obtain more favorable learning results.

In addition, mean intersection-over-union (mIoU), which has been so far used to evaluate segmentation models, has a problem in that the size of each object in an image is not considered at all. That is, in the existing evaluation method, only whether relatively large objects are segmented is considered, and whether small objects are segmented is not taken into consideration.

According to the present disclosure described below, a segmentation model is trained based on a size-weighted loss function in which weightings are given to pixels according to the size of objects in an image in order to be capable of detecting and segmenting even small objects, and there is provided an evaluation method based on instance-aware mean intersection-over-union (IA-mIoU) in which an IoU value is calculated per object so that it is also possible to evaluate a segmentation model factoring in whether it is able to detect even small-sized objects.

A method of segmenting objects in an image using artificial intelligence includes obtaining, by an analysis device, an image containing at least one object; inputting the image acquired by the analysis device into a segmentation model; and segmenting, by the analysis device, objects in the acquired image based on values output by the segmentation model, wherein an image containing at least one object is used as learning data, the size of objects in the learning data is estimated as part of the learning process, different weightings are given to pixels of which the objects consist according to the estimated size of the objects, and the segmentation model is trained based on a loss function in which the given weightings are considered, a size-weighted loss function.

According to the present disclosure described below, it is possible to create a segmentation model capable of detecting small objects as well as large objects and evaluate the segmentation model factoring in whether it is able to detect and segment even small-sized objects as well.

BRIEF DESCRIPTION OF THE DRAWINGS

FIG. 4 shows a comparison of methods of evaluating the performance of a segmentation model.

FIG. 5 shows an embodiment where the performance of a segmentation model is evaluated based on IA-mIoU.

FIG. 7 shows the results of an experiment for evaluating the performance of models.

FIG. 8 shows the results of an experiment for evaluating the performance of a model.

DETAILED DESCRIPTION

Figure 1:
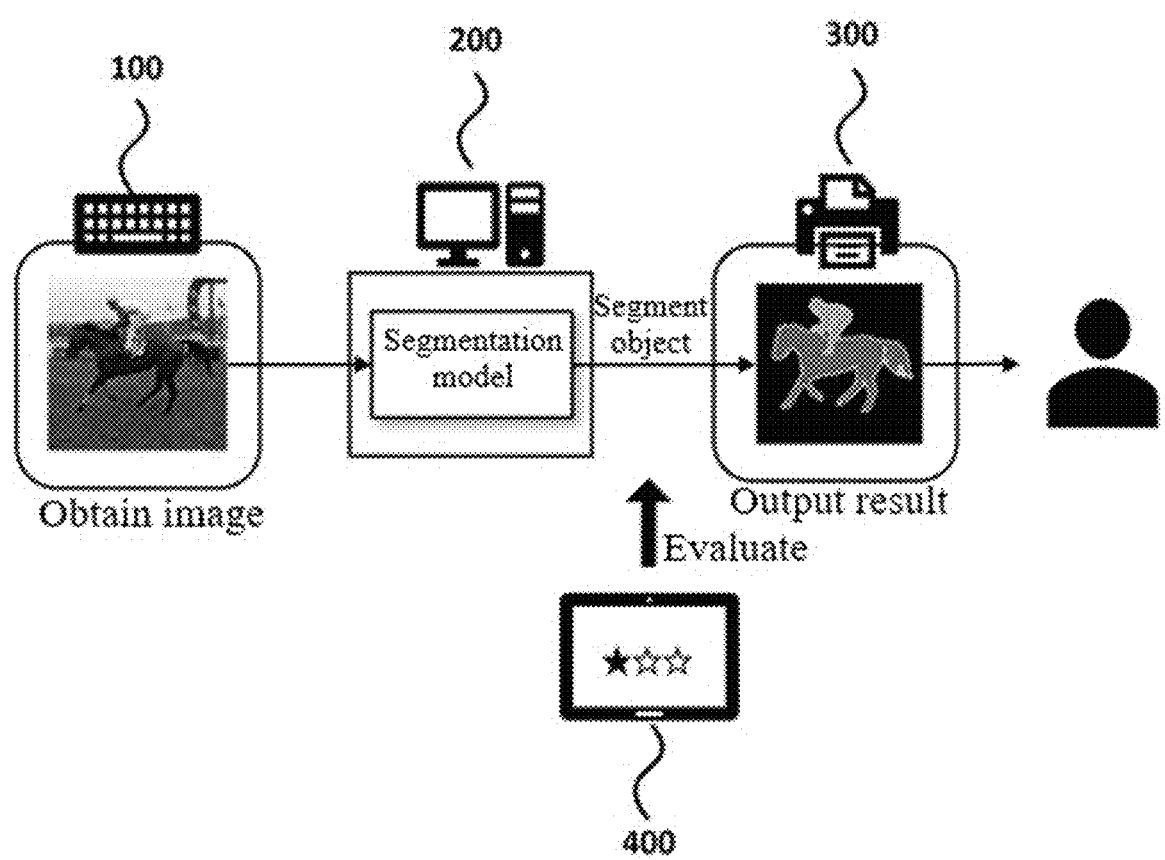
FIG. 1 shows the overall process of segmenting objects in an image.

Since various modifications and embodiments of the technology described below are possible, specific embodiments will be described in detail with reference to the appended drawings. However, this is not intended to limit the technology described below to specific embodiments, and it should be understood that the technology includes all modifications, equivalents, and substitutions included in the scope thereof.

Expressions such as "first," "second," "A," and "B" may be used to describe various components, but the components are not limited by the above-mentioned expressions. The expressions are used only for the purpose of distinguishing one component from another. For example, within the scope of the technology described below, any first component may be referred to as the second component, and any second component may also be referred to as the first component. The expression "and/or" means that a combination of a plurality of related items or any of the plurality of related items is included.

Expressions in the singular form among the expressions used in this specification should be understood to include the meaning of the plural form unless they clearly mean otherwise in the context. Furthermore, expressions such as "comprise" are used to indicate that an embodied feature, a number, a step, an operation, a component, a part, or a combination thereof exists, and the possibility that one or more other features, numbers, steps, operations, components, parts, or combinations thereof may exist or be added should not be excluded by such expressions.

Prior to a detailed description of the drawings, it is intended to clarify that the classification of the components described in the specification is only based on the main function of each component. That is, two or more components to be described below may be combined into one component, or one component may be divided into two or more components each having more subdivided function. In addition, each of the components described below may additionally perform some or all of the functions that other components are responsible for in addition to its main function, and it goes without saying that some of the main respective functions that the components are each responsible for may be carried out by another component.

Furthermore, in relation to adopting a method, each step involved in the method may be taken in a different order from its stated order unless its order is explicitly specified in the context. That is, each step may be taken in its specified order, or all steps may be taken simultaneously or may be taken in a reverse order.

Prior to a description of the technology to be described below, the related terms will be described.

In the present disclosure described below, "segmentation" includes segmenting objects in an image.

In the present disclosure, a "semantic segmentation" is a segmentation method and involves the operation of segmenting all pixels in an image into semantic units as. Pixels in an image are mainly segmented into classes.

In the present disclosure, an "instance segmentation" is a segmentation method and involves the operation of classifying by determining whether there is one object in a bounding box found for each object on an image.

In the present disclosure, "intersection over union (IoU)" is used in the process of evaluating the performance of a segmentation model. As a value of the IoU is higher, a model may have a higher level of ability to detect objects.

In the present disclosure, "mean intersection over union (mIoU)" is used in the process of evaluating the performance of a segmentation model, and refers to a value indicating the average of values of the IoU calculated for each class.

In the present disclosure, a "prediction mask" is a value estimated by a segmentation model by segmenting an object in an image.

In the present disclosure, a "ground-truth mask" is a value at which an object is actually located in an image.

In the present disclosure, a "learning model" refers to a machine learning model, and examples of the machine learning model may include various types of models. For example, the machine learning model may be a decision tree, a random forest (RF), a K-nearest neighbor (KNN), a naive Bayes, a support vector machine (SVM), an artificial neural network (ANN), etc.

The ANN may be a deep neural network (DNN) such as a convolutional neural network (CNN), a recurrent neural network (RNN), a restricted Boltzmann machine (RBM), a deep belief network (DBN), a generative adversarial network (GAN), and relation networks (RL).

The CNN model may include a convolution layer, a pooling layer, a drop layer, a flatten layer, a fully connected layer, and a dense layer.

The convolution layer may extract features from input information and create a feature map based on the features. The pooling layer may reduce the size of the feature map created by the convolution layer, or may extract the largest value among the values of the feature map (max pooling layer) to emphasize specific data, or may extract the average value of the values of the feature map (average pooling layer). The drop layer may use only a part of a neural network model during training to prevent overfitting in a deep learning model. The flatten layer may make the characteristics of extracted data into one dimension. The fully connected layer may connect all nodes of the layers, and may lastly determine which classification the input data falls into. In this process, the SoftMAX function may be used.

In the present disclosure, "continual learning" is the same concept as the concept of lifelong learning and gradual learning, and may involve a method where, when new data that has never been learned is continuously input to a model trained with existing learning data, the model is sequentially trained and updated with the newly input data rather than the model is trained over again. Accordingly, real-time responses to new data may also be possible.

The continual learning method may involve at least one of an elastic weight consolidation (EWC), a generative replay, a dynamic expandable network, and a synaptic intelligence.

Hereinafter, the overall process of detecting and segmenting objects in an image by an analysis device will be described with reference to FIG. 1.

FIG. 1 shows the overall process of segmenting objects in an image.

Referring to FIG. 1, an analysis device 200 may acquire an image to be analyzed through an input device 100. The analysis device 200 may input the acquired image to a segmentation model. The analysis device 200 may be enabled to segment objects in the acquired image by values output by the segmentation model. The analysis device 200 may output the operation results through an output device 300.

Referring to FIG. 1, an image obtained through the input device 100 may contain objects to be segmented. One or more objects may be contained. The objects may be of one or more types or classes. The objects may be of various sizes.

Referring to FIG. 1, a segmentation model used for the analysis of the analysis device 200 may be a model for detecting and segmenting objects in an image.

The segmentation model may be a learning model trained to segment objects in an image including at least one object. Different from the existing models, the segmentation model may be a model trained to segment even small objects in an image. For this reason, the segmentation model may be a model trained based on a size-weighted loss function (L aw) where each pixel is given a weighting. A detailed description thereof will be provided below.

The segmentation model may be a model that is trained based on the loss function (L aw) where weightings are given and is then trained based on a size-balanced loss function (L a b), which is balanced by continual training. A detailed description thereof will be provided below.

Referring to FIG. 1, the values output by the output device 300 may indicate the results of segmenting objects in an image.

The result values may be a value showing which object or which class a pixel indicating an object belongs to.

The result values may be a value indicating to which class each object belongs and to which object in the class it corresponds.

The result values may be displayed in different colors for each object.

Referring to FIG. 1, an evaluation device 400 may evaluate the performance of the segmentation model of the analysis device base on the values output by the output device.

Instance-aware mean intersection-over-union (IA-mIoU) may be used as an index for evaluating the segmentation model. A detailed description thereof will be provided below.

Hereinafter, the process of training a segmentation model according to an embodiment of the present disclosure will be described.

Figure 2:
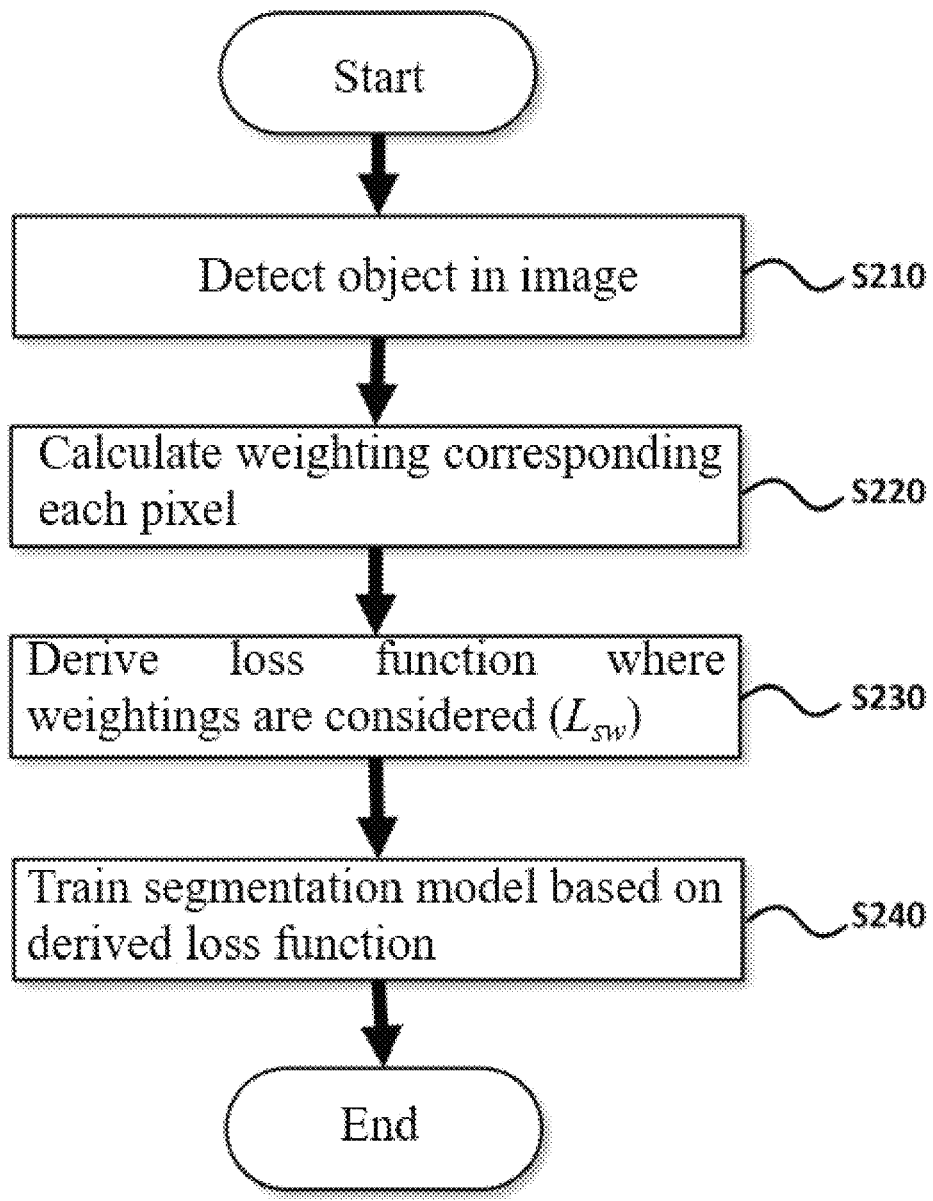
FIG. 2 shows the process of training a segmentation model.

FIG. 2 shows the process of training a segmentation model. The process of training the segmentation model to be trained may largely involve the step of detecting objects in an image at S210, the step of giving a weighting to each pixel of which the detected objects consist at S220, the step of deriving a loss function in consideration of the calculated weightings at S230, and the step of training the segmentation model based on the derived loss function at S240.

With reference to FIG. 2, hereinafter, the step of detecting objects in an image at S210 will be described. Since instance ground-truth masks may not be available for training when detecting objects in an image, connected components in each class may first be found based on pseudo ground-truth masks. The k-th connected component in the c-th class found in that manner may be defined as $I_{c,k}$.

Figure 3:
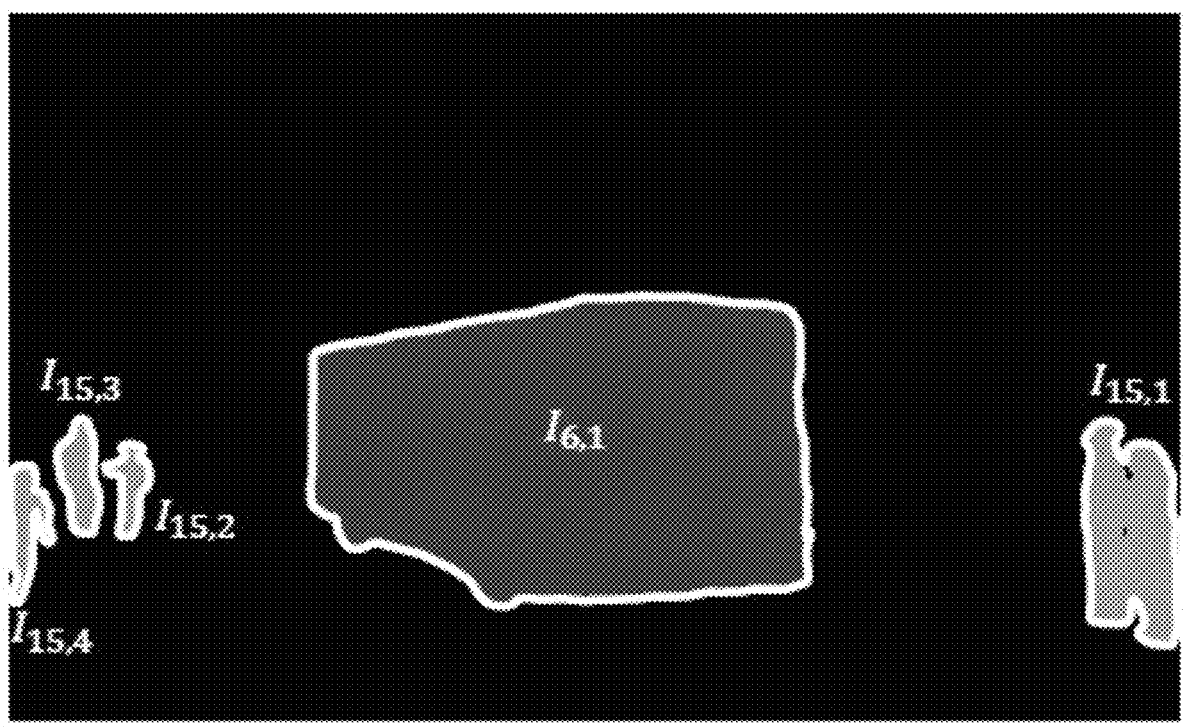
FIG. 3 shows one of the embodiments in which objects in an image are detected during training.

FIG. 3 shows one of the embodiments in which objects in an image are detected during training. In FIG. 3, "$I_{6,1}$" is the first connected component in the sixth class (buses), and "$I_{15,2}$" is the second connected component in the 15th class (people).

Referring to FIG. 2, the step of giving a weighting to each pixel of which the detected objects consist according to the size of the objects at S220 will be described hereinafter.

Equation 1 below represents an equation for giving weightings to pixels of which an object is formed.

$$w_{x,y} = \begin{cases} 1, & \text{if } Y_{x,y} = 0, \\ \min\left(\tau, \dfrac{\sum_{h=1}^{K} S_{c,k}}{S_{c,k}}\right), & \text{otherwise,} \end{cases} \quad \text{[Equation 1]}$$

In the Equation 1 above, x and y are x and y coordinates of a pixel, respectively; $Y_{x,y}$ is a class label to which each pixel belongs at the x and y coordinates; c is the number of each class; k is the number of a corresponding object in a class; K is the total number of objects in a corresponding class; $S_{c,k}$ is the number of pixels of which the $I_{c,k}$ is formed; and τ is the upper limit for weightings.

According to the Equation 1, a weighting given to a pixel may vary depending on the relative size of the object to which the pixel belongs in a class. In a class, when the relative size of an object is large, a low weighting may be given, and when the relative size of an object is small, a high weighting may be given.

For example, referring to FIG. 3, in the class of people, the object $I_{15,2}$ has a smaller size than the object $I_{15,1}$, so it may be given a higher weighting than the $I_{15,1}$. Conversely, the $I_{15,1}$ may be given a lower weighting than the $I_{15,2}$ because its size is larger than the $I_{15,2}$. Since the object $I_{6,1}$ is the only object in the class of buses, there is no other object to be compared with. Thus, the object $I_{6,1}$ may be given a weighting of 1.

By the above-mentioned method, it may possible that, for a segmentation model, weightings are set in such a manner that the characteristics of small-sized objects, i.e., objects accounting for fewer pixels, in an entire image are effectively identified.

In addition, since the upper limit τ for a weighting given to a pixel is set in the Equation 1, it may also be possible to prevent a weighting of a pixel of a relatively small object from increasing indefinitely.

Referring to FIG. 2, the step of deriving the loss function where a weighting of each pixel is considered, the size-weighted loss function ($L_{sw}$), at S230 will be described hereinafter.

Equation 2 below represents the loss function in which the weighting derived from the Equation 1 is considered, the size-weighted loss function ($L_{sw}$).

$$L_{sw} = -\dfrac{1}{H \times W} \sum_{c=1}^{C} \sum_{x=1}^{H} \sum_{y=1}^{W} Y_{c,x,y} w_{x,y} \log(p_{c,x,y}) \quad \text{[Equation 2]}$$

In the Equation 2, H is the height of an image, W is the width of the image, $K_{c,x,y}$ is a class label of a corresponding pixel, $W_{x,y}$ is the weighting of the pixel calculated according to the Equation 1, $P_{c,x,y}$ and is the probability that the pixel is expected to belong to the c-th class at corresponding coordinates.

In the loss function $L_{sw}$, the weighting derived from the Equation 1 may be taken into account. Therefore, even objects with fewer pixels may be given high weightings to be considered during training.

When a learning model is trained based on the loss function $L_{sw}$, it may be possible to detect even relatively small objects in an image.

Hereinafter, the process of continuously training a segmentation model will be described.

In the continual learning method, a segmentation model may be first trained using an image containing a large-sized object in the learning data, and then may be continuously trained using an image containing a small-sized object.

Whether the size of an object is large or small may be predetermined based on certain criteria. For example, when an object occupies pixels of 60% or more in an entire image, it may be determined that the image contains a large-sized object, and when an object accounts for pixels of 60% or less in the entire image, it may be determined that the image contains a small-sized object.

By continuously training the segmentation model, it may be possible to prevent the segmentation model from being trained to segment only small-sized objects in an image so that both small and large objects are evenly segmented.

The continual learning method may involve at least one of an elastic weight consolidation (EWC), a generative replay, a dynamic expandable network, and a synaptic intelligence.

Equation 3 below represents a loss function used for the EWC, a size-balanced loss function ($L_{SB}$).

$$L_{sb} = L_{sw} + \sum_i \frac{\lambda}{2} F_i (\theta_i - \theta^*_{A,i})^2 \quad \text{[Equation 3]}$$

In the Equation 3, $é_i$ is a value of the current i-th parameter, $é_{A,I}$ is a value of the i-th parameter that has not yet undergone the EWC training, F is the Fisher information matrix, ë* is a variable indicating the importance of historical data, and $L_{sw}$ is the loss function where a weighting of each pixel is considered.

The continual learning method by the EWC may be largely divided into two steps. In the first step, values of important parameters in the Fisher information matrix may be updated based on the existing pixel-wise cross-entropy loss function. Then, the values of the important parameters in the matrix may be fine-tuned to be regularized based on the loss function where a weighting is given ($L_{sw}$). By taking such steps, it may be possible to derive the size-balanced loss function $L_{sb}$.

Hereinafter, a method of evaluating the performance of a segmentation model will be described.

FIG. 4 shows a comparison of methods of evaluating the performance of a segmentation model.

In FIG. 4, the boxes with black borders represent ground-truth masks, which are pixels where an object is actually located, and the colored pixels represent prediction masks, which are pixels in which a segmentation model expects the object to be located.

Figure (A) of FIG. 4 shows a conventional method of evaluating the performance of a segmentation model.

Equation 4 below is an equation for the IoU and the mIoU used for the conventional evaluation method.

$$IoU_c = \frac{Pr_c \cap GT_c}{Pr_c \cup GT_c}, mIoU = \frac{\sum_{c=0}^{N} IoU_c}{N} \quad \text{[Equation 4]}$$

In the Equation 4, c is the number of a class, N is the total number of classes, $Pr_C$ is a value of a prediction mask in the corresponding c-th class, $GT_C$ is a value of a ground-truth mask in the c-th class, $IoU_c$ is an IoU value in the c-th class, and mIoU is the average of the IoU values in a class in an image.

In the conventional mIoU-based method, after obtaining an IoU value for each class, the average of the IoU values for all classes is calculated to obtain an mIoU value. In other words, in order to calculate the mIoU value, for each class, the IoU value is calculated by placing the number of pixels belonging to the union of all the ground-truth masks and the prediction masks in the denominator and the number of pixels belonging to the intersection of the ground-truth masks and the prediction masks in the numerator, and then the average of the IoU values for all the classes is calculated.

When using the existing method, there is a problem in that all pixels are considered equal. For example, when there are two objects each consisting of 30 pixels and 500 pixels in an image, in the case of using the existing mIoU-based method, an error in 30 pixels occurs when 30 pixels of the object consisting of 30 pixels are not detected, and an error in 30 pixels occurs even when pixels of the object consisting of 500 pixels are not detected. Therefore, the mIoU values for both objects are identical. As a result, the former, i.e., a small-sized object may not be completely detected compared to the latter, i.e., a large-sized object. That is, it means that, when using the existing mIoU-based method, it may not be possible to detect relatively small objects in an image.

Figure (B) of FIG. 4 shows a method of evaluating a segmentation model in consideration of whether the segmentation model is able to detect even small objects.

Equation 5 below is an equation for the IoU, $IoU_c$, and IA-mIoU used to evaluate a segmentation model factoring in whether even small objects can be detected.

$$IoU_{c,i} = \frac{Pr_{c,i} \cap GT_{c,i}}{Pr_{c,i} \cup GT_{c,i}}, I\hat{o}U_c = \frac{\sum_{i=0}^{T} IoU_{c,i}}{T} \quad \text{[Equation 5]}$$

$$IA - mIoU = \frac{\sum_{c=0}^{N} I\hat{o}U_c}{N}$$

In the Equation 5, c is the number of a class, i is the number of an object in a class, T is the total number of objects in the class, $Pr_{c,i}$ is a value of a prediction mask of the i-th object in the c-th class, $G_{c,i}$ is a value of a ground-truth mask of the i-th object in the c-th class, and N is the number of all classes in an image.

In the method of evaluating a segmentation model by calculating an IoU value for each object, the IoU value for each object may be first calculated, and then the average of the IoU values for all objects may be obtained. In other words, after the IoU value for each object is calculated, the average of the IoU values for all objects in a class may be calculated to calculate an IoU value for each class, and then the average of the $IoU_c$ values for all classes in an entire image may be calculated, in order to obtain a value of the instance-aware mean intersection-over-union (IA-mIoU), which serves as the criterion for evaluating a model.

In the method of evaluating a segmentation model based on the IA-mIoU, all pixels may not be considered equal. For example, when there are two objects each consisting of 30 pixels and 500 pixels in an image, an IoU value may be calculated for each object in the evaluation method based on the IA-mIoU. That is, when 30 pixels of both objects consisting of 30 pixels and 500 pixels are not detected, a much smaller IoU value may be obtained in the former case. Accordingly, when the evaluation method based on the IA-mIoU is used, it may also possible to evaluate a model as to whether it is capable of detecting and segmenting even relatively small objects.

Hereinafter, the method of evaluating the performance of a segmentation model based on the IA-mIoU will be described in detail with reference to FIG. 5.

FIG. 5 shows an embodiment where the method of evaluating the performance of a segmentation model based on the IA-mIoU is compared with the conventional evaluation method.

In FIG. 5, the boxes with red borders represent $GT_{c,1}$ and $GT_{c,2}$, which respectively denote values of ground-truth masks of the first and second objects in a corresponding class.

In FIG. 5, the colored pixels represent $Pr_{c,1}$ and $Pr_{c,2}$, which respectively denote values of prediction masks in which the first and second objects in the class are expected to be located.

Figure (a) Case 1 of FIG. 5 shows an example in which one prediction mask is obtained by a segmentation model for a single object.

In the Case 1, it may possible to calculate values of a ground-truth mask and a prediction mask for each object at steps 1 and 2. An IA-mIoU value may be calculated based on the calculated values. Based on the calculated IA-mIoU value, the performance of a segmentation model may be evaluated.

Figure (b) Case 2 of FIG. 5 shows an example in which one prediction mask is obtained by a segmentation model for two objects.

In the Case 2, for each object, the number of pixels accurately matching the prediction mask may be calculated at step 1. Then, the ratio of the accurately matching pixels of an object to the accurately matching pixels of another object may be calculated at step 2. Based on the calculated ratio, the number of pixels unmatching the prediction mask may be calculated for each object at step 3.

For example, the prediction mask matches 16 pixels of object 1 and 8 pixels of object 2 at step 1. The ratio of the pixels matching the prediction mask of the object 1 to those matching the prediction mask of the object 2 is 2:1 at step 2. When the number of pixels not matching the prediction mask is calculated based on the ratio for each object, it can be said that 10 pixels of the object 1 and 5 pixels of the object 2 do not match the prediction mask at step 3. To summarize, a value of the ground-truth mask of the object 1 is 16 and a value of the prediction mask is 26 (16+10), and a value of the ground-truth mask of the object 2 is 8 and a value of the prediction mask is 13 (8+5). Based on the calculated values, an IA-mIoU value may be calculated.

Hereinafter, the method of evaluating a segmentation model based on the IA-mIoU will be compared with the conventional evaluation method with reference to FIG. 6.

Figure 6:
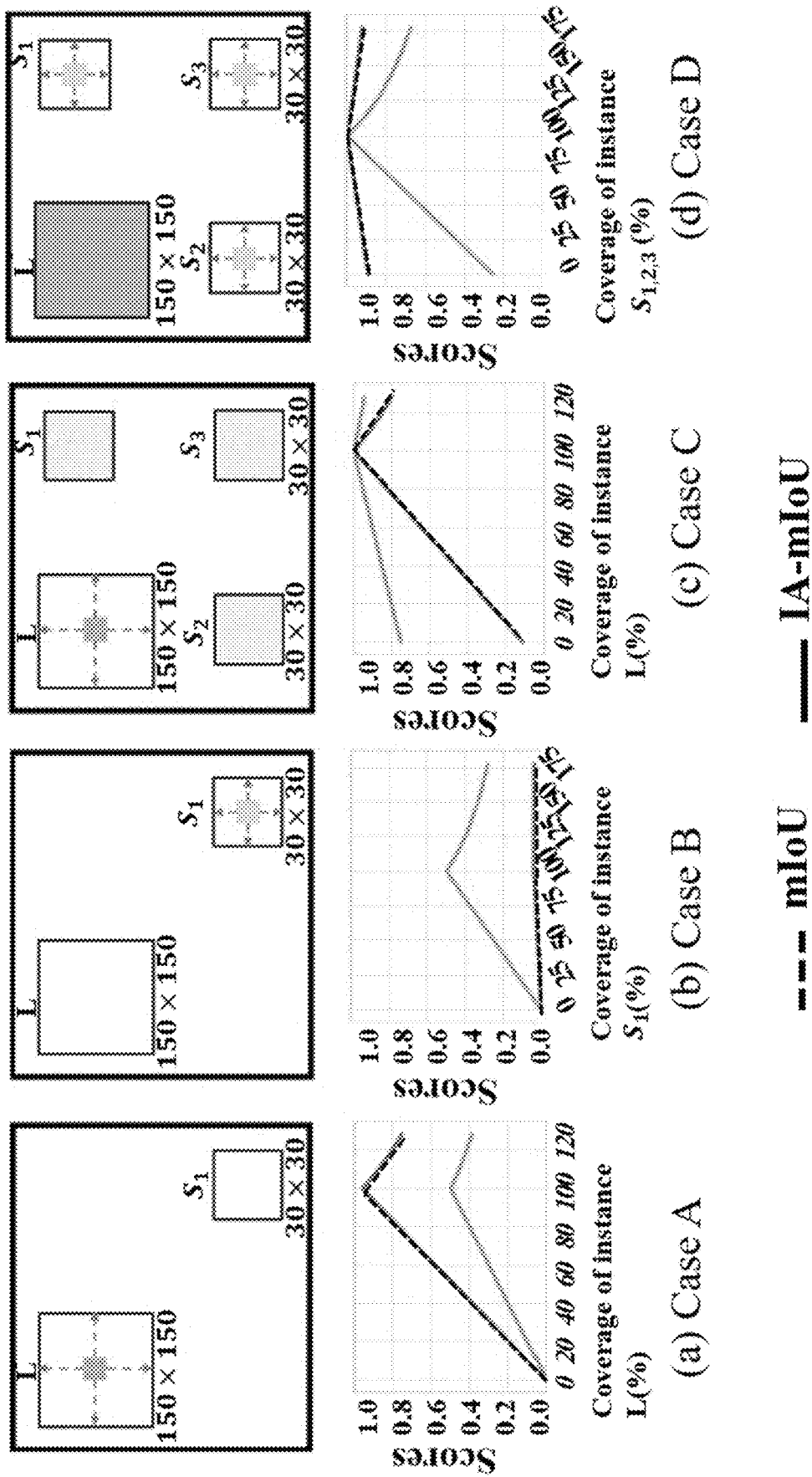
FIG. 6 shows an embodiment in which a method of evaluating a segmentation model based on the IA-mIoU is compared with an existing evaluation method.

FIG. 6 shows an embodiment in which the method of evaluating a segmentation model based on the IA-mIoU is compared with the existing evaluation method based on the mIoU.

In the graph in FIG. 6, L denotes a relatively large object, $S_{1\ to\ 3}$ denotes a relatively small object, the X-axis represents how accurately an object is detected, and the Y-axis represents scores obtained by evaluating a segmentation model based on the above-mentioned evaluation methods.

In the graph in FIG. 6, the solid lines represent the results of evaluating a segmentation model based on the IA-mIoU, and the broken lines represent the results of evaluating a segmentation model by the existing evaluation method based on the mIoU.

Figures (a) Case A and (b) Case B of FIG. 6 show the results of evaluating the performance of the segmentation model when there are one large object (L) and one small object (S) in an image.

Figures (c) Case C and (d) Case D of FIG. 6 show the results of evaluating the performance of the segmentation model when there are one large object (L) and three small objects (S) in an image.

When the performance of the segmentation model is evaluated by the existing method based on the mIoU, the segmentation model may appear to deliver an excellent performance in the case of detecting large-sized objects (L) (Cases A and C), but it cannot be said that the segmentation model may also do so in the case of detecting small-sized objects (S) (Cases B and D).

In contrast, when the performance of the segmentation model is evaluated based on the IA-mIoU, the segmentation model may appear to deliver a slightly less excellent performance in the case of detecting only large-sized objects (L) than when evaluated by the conventional evaluation method (Case A), but it may appear to deliver a great performance in the case of detecting small-sized objects (S) (Cases B, C and D).

When the performance of the segmentation model is evaluated based on the IA-mIoU, it may be possible to evaluate the segmentation model as to whether it is able to detect small objects as well as large objects.

Hereinafter, experimental results will be described, and the experiment is for the purpose of comparing the performance of a segmentation model trained based on the loss function ($L_{SW}$) where weightings given according to each object's size are considered and the method of evaluating the performance of the segmentation model based on the IA-mIoU, with the conventional segmentation model and evaluation method.

FIG. 7 shows the results of an experiment for evaluating the performance of models.

In FIG. 7, Deeplab V2, IRN, CDA, EDAM, NS-ROM, BANA, and BBAM are existing segmentation models. "+Ours" represents that the existing segmentation models have been trained base on the loss function ($L_{SW}$).

In FIG. 7, "Method" refers to how the segmentation models are evaluated, "mIoU" is the conventional method of evaluating a segmentation model, "IA-mIoU" is the above-mentioned method of evaluating a segmentation model based on the IA-mIoU. "$IA_L$," "$IA_M$," and "$IA_S$" refer to the results of evaluating the performance of a segmentation model with images containing large-sized, medium-sized, and small-sized objects, respectively, in the PASCAL VOC dataset.

FIG. 7 shows that, when the existing models are trained based on the loss function ($L_{SW}$), the performance of all the models may be improved. It is seen that this improvement in performance may be more noticeable in the case of detecting and segmenting small objects ($IA_S$).

In terms of methods of evaluating the performance of models, the segmentation models, BANA and BBAM, may have low IA-mIoU values and high mIoU values. This proves that the BANA and the BBAM may be able to detect large objects but not small objects. This means that it may not possible to determine that a segmentation model with a high mIoU value performs well in all cases.

FIG. 8 shows the results of an ablation study for evaluating the performance of a model trained based on the loss function ($L_{sw}$) in which weightings given according to each object's size are considered and the loss function ($L_{sb}$) by the continual learning method.

In FIG. 8, "DeepLabV2" refers to an existing baseline model, "with $L_{sw}$" indicates that the model has been trained based on the loss function ($L_{sw}$) in which weightings are considered, and "with $L_{sb}$" indicates that the model has been trained by the continual learning method.

In FIG. 8, "mIoU" is the conventional method of evaluating a segmentation model, and "IA-mIoU" is the above-mentioned method of evaluating a segmentation model based on the IA-mIoU. "$IA_L$," "$IA_M$," and "$IA_S$" refer to the results of evaluating the performance of a segmentation model with images containing large-sized, medium-sized, and small-sized objects, respectively, in the PASCAL VOC dataset. "$IA_L^{70-100}$" refers to the test results based on images containing large objects whose sizes are in the top 30%, i.e., objects accounting for 60% or more of all pixels, in the PASCAL VOC dataset.

FIG. 8 shows that the models trained with the loss functions, $L_{sw}$ and $L_{sb}$, respectively, may perform better in terms of detecting small objects ($IA_S$) than the existing model. In addition, it is seen that the model trained with the $L_{sb}$ may detect large objects better ($IA_L$ and $A_L^{70-100}$) than the model trained with the $L_{sw}$.

Figure 9:
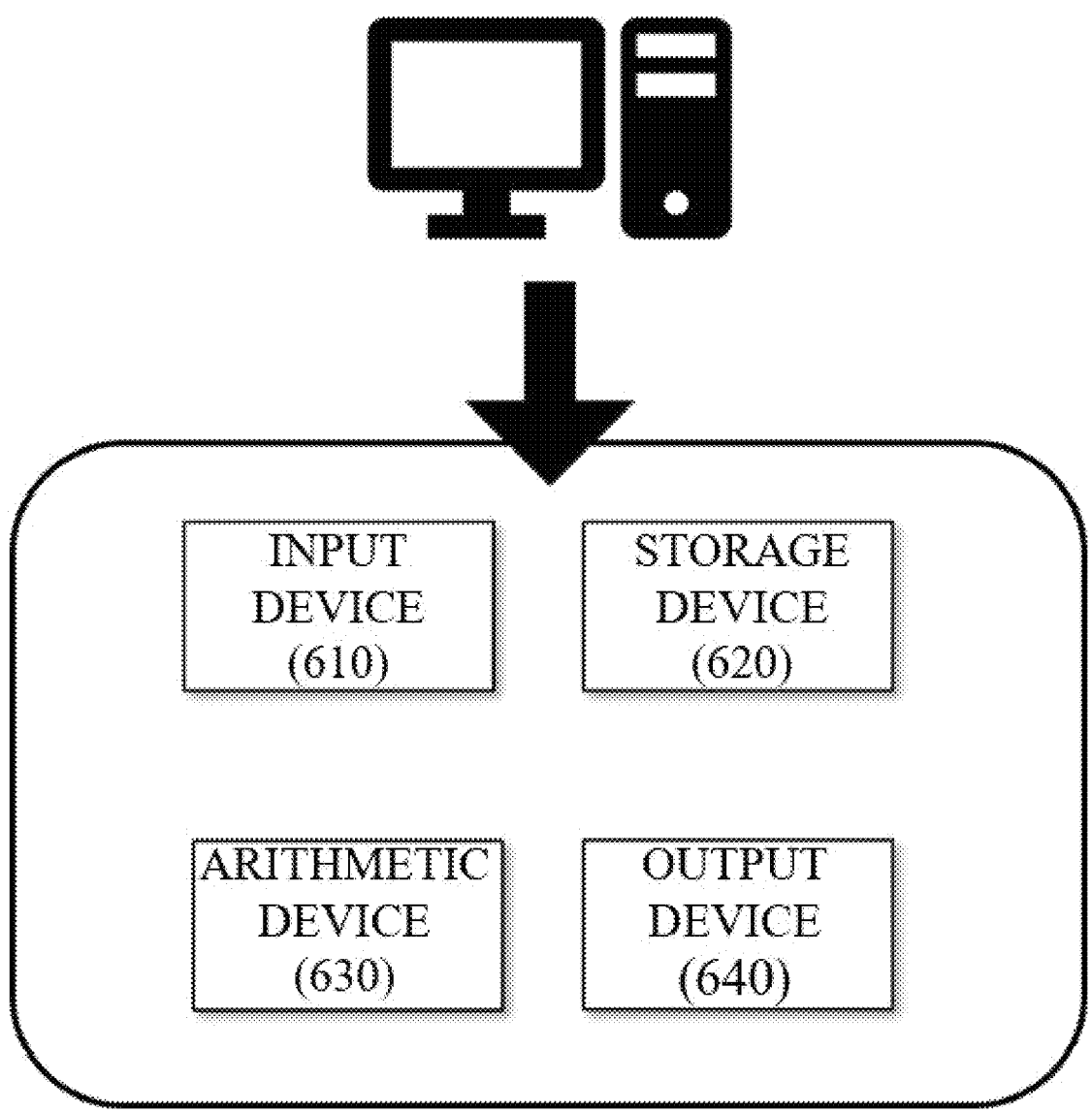
FIG. 9 shows the feature of an analysis device for segmenting objects in an image.

With reference to FIG. 9, the feature of an analysis device for segmenting objects in an image will be described hereinafter.

FIG. 9 shows the feature of the analysis device for segmenting objects in an image.

The analysis device 600 corresponds to the aforementioned analysis device 200 in FIG. 1.

The analysis device 600 may be embodied in various forms with a PC, a laptop computer, a smart device, a server, a chipset dedicated to process data, etc.

The analysis device 600 may include an input device 610, a storage device 620, and an arithmetic device 630. The analysis device may further include an output device 640.

The input device 610 in FIG. 9 may include an interface device for receiving certain commands or data, such as a keyboard, a mouse, and a touch screen.

The input device 610 corresponds to the above-mentioned input device 100 in FIG. 1.

The input device 610 may include a communication device for receiving and transmitting certain information through a wired or wireless network.

The input device 610 may have the feature of receiving information through a separate storage device such as a USB drive, a CD, and a hard disk.

The input device 610 may receive input data through a separate measuring device or a separate DB.

The input device 610 may receive an image including at least one object.

The storage device 620 in FIG. 9 may store information received from the input device 610.

The storage device 620 may store a segmentation model for segmenting objects in an image.

The storage device 620 may store result values output by the segmentation model.

The storage device 620 may store learning data used for training the segmentation model.

The arithmetic device 630 in FIG. 9 may input an image received from the input device 610 to the segmentation model to obtain an output value, and then may segment an object in the image based on the output value.

The output device 640 in FIG. 9 may be a device for outputting certain information.

The output device 640 may output an interface required for data processing, input data, analysis results, etc.

The output device 640 may be embodied in various forms such as a display device, a device for outputting documents, and a communication device.

What is claimed is:

1. A method of segmenting objects in an image using artificial intelligence, comprising:
    obtaining, by an analysis device, an image containing at least one object;
    inputting the image acquired by the analysis device into a segmentation model; and
    segmenting, by the analysis device, objects in the acquired image based on values output by the segmentation model,
    wherein an image containing at least one object is used as learning data, the size of objects in the learning data is estimated as part of the learning process, different weightings are given to pixels of which the objects consist according to the estimated size of the objects, and the segmentation model is trained based on a loss function in which the given weightings are considered, a size-weighted loss function,
    wherein the method of giving different weightings to pixels involves giving high weightings to pixels when the estimated relative size of the object is large and giving low weightings to pixels when the estimated relative size of the object is small.

2. The method of claim 1,
    wherein an upper limit for weightings is set, and a weighting is given within the range not exceeding the upper limit.

3. The method of claim 1,
    wherein the loss function in which weightings are considered is based on $L_{sw}$ according to the following equations:

$$L_{sw} = -\frac{1}{H \times W} \sum_{c=1}^{C} \sum_{x=1}^{H} \sum_{y=1}^{W} Y_{c,x,y} w_{x,y} \log(p_{c,x,y}),$$ [Equations]

wherein H is the size of an image, W is the width of the image, $Y_{c,x,y}$ is a class label at corresponding coordinates, $W_{x,y}$ is a weighting at the corresponding coordinates calculated according to the equation below, and $P_{c,x,y}$ is the probability that a pixel is expected to belong to the c-th class at the corresponding coordinates, and $$w_{x,y} = \begin{cases} 1, & \text{if } Y_{x,y} = 0, \\ \min\left(\tau, \frac{\sum_{k=1}^{K} S_{c,k}}{S_{c,k}}\right), & \text{otherwise,} \end{cases}$$

wherein x and y are x and y coordinates of a pixel, respectively, $Y_{x,y}$ is a class label at the x and y coordinates, $S_{c,k}$ is the number of pixels in its connected component, i.e., the k-th instance in the c-th class, k is the number of an instance in a corresponding class, and T is an upper limit for weightings.

4. The method of claim 1 further comprising the step of evaluating the performance of the segmentation model by the analysis device, which follows the step of segmenting objects in an image.

5. The method of claim 4,
wherein the step of evaluating the performance of the segmentation model involves the step of detecting a class and objects belonging to the class in an image including at least one object; and the step of calculating a value of intersection over union (IoU) for each of the objects and evaluating the performance of the segmentation model based on the IoU value per object.

6. The method of claim 4,
wherein the step of evaluating the performance of the segmentation model involves using a value of instance aware mean intersection over union (IA-mIoU) according to the following equation:

$$IoU_{c,i} = \frac{Pr_{c,i} \cap GT_{c,i}}{Pr_{c,i} \cup GT_{c,i}}, \quad I\hat{o}U_c = \frac{\sum_{i=0}^{T} IoU_{c,i}}{T}$$

$$IA - mIoU = \frac{\sum_{c=0}^{N} I\hat{o}U_c}{N},$$ [Equation]

wherein c is the number of a class, i is the number of an object in the class, T is the total number of objects in the class, $Pr_{c,j}$ is a value of a prediction mask of the i-th object in the c-th class, $GT_{c,i}$ is a value of a ground-truth mask of the i-th object in the c-th class, $IoU_{c,i}$ is an IoU value of the i-th object in the c-th class, $I\hat{o}U_c$ is the average value of the $IoU_{c,i}$ in the c-th class, and IA-mIoU is the average of the $I\hat{o}U_c$ of all classes in an image.

7. A method of segmenting objects in an image using artificial intelligence, comprising:
obtaining, by an analysis device, an image containing at least one object;
inputting the image acquired by the analysis device into a segmentation model; and
segmenting, by the analysis device, objects in the acquired image based on values output by the segmentation model,
wherein an image containing at least one object is used as learning data, the size of objects in the learning data is estimated as part of the learning process, different weightings are given to pixels of which the objects consist according to the estimated size of the objects, and the segmentation model is trained based on a loss function in which the given weightings are considered, a size-weighted loss function,
wherein the method of training a learning model based on the loss function in which weightings are considered involves the step of first training the learning model using an image including an object having a size smaller than a predetermined reference value in the learning data; and the step of making a final learning model by continuously training the trained model using an image including an object having a size greater than the predetermined reference value in the learning data.

8. A device for segmenting objects in an image using artificial intelligence, comprising:
an input device for obtaining an image including at least one object;
a storage device for storing a segmentation model that segments objects in the image acquired by the input device; and
an arithmetic device inputting the image acquired by the input device to the segmentation model and segmenting objects in the image based on values output by the segmentation model,
wherein an image containing at least one object is used as learning data, the size of objects in the learning data is estimated as part of the learning process, different weightings are given to pixels of which the objects consist according to the estimated size of the objects, such that high weightings are given to pixels when the estimated relative size of the object is large and low weightings are given to pixels when the estimated relative size of the object is small, and the segmentation model is trained based on a loss function in which the given weightings are considered, a size-weighted loss function.

* * * * *